United States Patent
Yi

(10) Patent No.: US 11,433,867 B2
(45) Date of Patent: Sep. 6, 2022

(54) ELECTRIC BRAKE SYSTEM FOR ELECTRIC VEHICLE

(71) Applicant: DOOSAN CORPORATION, Seoul (KR)

(72) Inventor: Jun Il Yi, Seoul (KR)

(73) Assignee: DOOSAN INDUSTRIAL VEHICLE CO., LTD., Incheon (KR)

( * ) Notice: Subject to any disclaimer, the term of this patent is extended or adjusted under 35 U.S.C. 154(b) by 172 days.

(21) Appl. No.: 16/718,564

(22) Filed: Dec. 18, 2019

(65) Prior Publication Data

US 2020/0198612 A1    Jun. 25, 2020

(30) Foreign Application Priority Data

Dec. 20, 2018  (KR) .................. 10-2018-0166143

(51) Int. Cl.
  *B60T 15/04*  (2006.01)
  *B60T 7/04*  (2006.01)
  *F16D 65/56*  (2006.01)

(52) U.S. Cl.
  CPC ............ *B60T 15/041* (2013.01); *B60T 7/042* (2013.01); *B60T 7/045* (2013.01); *F16D 65/563* (2013.01); *F16D 2500/50841* (2013.01); *F16D 2500/50866* (2013.01)

(58) Field of Classification Search
  CPC ......... B60B 33/021; B66D 5/00; B60T 7/042; B60T 7/045; B60T 13/743; B60T 13/748; B60T 15/041; F16D 94/00; F16D 53/00; F16D 65/563; F16D 2055/0058
  USPC .......................................................... 188/74
  See application file for complete search history.

(56) References Cited

U.S. PATENT DOCUMENTS

| | | | | |
|---|---|---|---|---|
| 3,833,102 A | * | 9/1974 | Stable | F16D 65/74 188/196 A |
| 4,684,838 A | * | 8/1987 | Casanova | H02K 7/1025 188/71.1 |
| 4,966,255 A | * | 10/1990 | Fossum | F16D 65/567 188/71.9 |

(Continued)

FOREIGN PATENT DOCUMENTS

| | | |
|---|---|---|
| DE | 102011004813 A1 | 8/2012 |
| JP | 2004-270759 A | 9/2004 |
| JP | 2012-122574 A | 6/2012 |

OTHER PUBLICATIONS

Search Report issued in corresponding European Patent Application No. 19217841.6 dated Apr. 22, 2020, consisting of 7 pp.

*Primary Examiner* — Robert A. Siconolfi
*Assistant Examiner* — San M Aung
(74) *Attorney, Agent, or Firm* — Volpe Koenig

(57) ABSTRACT

The present disclosure relates to an electric brake system for an electric vehicle, which is more economical by simplifying a configuration of an electric vehicle that includes a main service brake and an electromagnetic brake, the electric brake system including an inductor, in a spherical shape, formed so that a drive axle penetrates through a center portion of the inductor; a plurality of springs inserted into holes defined in the inductor; an armature, in a disk shape, provided to contact the spring; and a friction disk mounted on a side of a motor, where a braking force is generated by operating the friction disk toward the armature.

6 Claims, 5 Drawing Sheets

(56) References Cited

U.S. PATENT DOCUMENTS

| | | | | |
|---|---|---|---|---|
| 5,154,261 A | * | 10/1992 | Tanaka | B66D 5/30 188/161 |
| 5,873,443 A | * | 2/1999 | Meller | F16D 25/063 188/74 |
| 6,142,266 A | * | 11/2000 | Appeldorn | B60T 13/743 188/72.3 |
| 2008/0314701 A1 | * | 12/2008 | Bogelein | F16D 55/28 188/171 |
| 2013/0001036 A1 | * | 1/2013 | Ebuchi | F16D 27/112 192/84.1 |
| 2013/0192934 A1 | * | 8/2013 | Knop | F16D 65/186 188/72.3 |

* cited by examiner

ELECTRIC BRAKE SYSTEM FOR ELECTRIC VEHICLE

CROSS-REFERENCE TO RELATED APPLICATION

This application claims priority to and the benefit of Korean Patent Application No. 10-2018-0166143, filed on Dec. 20, 2018, in the Korean Intellectual Property Office (KIPO), the disclosure of which is incorporated by reference herein in its entirety.

1. Technical Field

Aspects of embodiments relate to an electric brake system for vehicles that use electricity as a power source.

2. Discussion of Related Art

Electric vehicles (EV) refer to vehicles that use a power of a battery that may be charged and discharged to drive an electric drive motor (e.g., a travel motor) and use a driving force of the electric drive motor as the whole or part of a power source.

As examples of electric vehicles, there are pure electric vehicles which only use electricity as a driving force, and hybrid electric vehicles which use both a driving force generated in a conventional engine-type internal combustion engine and a driving force of an electric motor.

Such an electric vehicle includes both a main service brake which uses a hydraulic pressure for safe braking while driving and an electromagnetic parking brake (hereinafter, referred to as an electromagnetic brake, i.e., "EM brake") to prevent the vehicle from sliding when parking or being stopped on a downhill. Further, in such an electric vehicle, as illustrated in FIG. 1, a friction disk for the main service brake and the EM brake are separately provided to be individually controlled so as to constrain rotation of a drive axle.

Referring to FIG. 2, an EM brake includes an inductor 1, in a concentric spherical shape, which is formed so that a drive axle may penetrate a center portion of the inductor 1, a plurality of springs 8 inserted into holes defined in the inductor 1, and an armature 7, in a disk shape, attached to the inductor 1 while the spring 8 is compressed by an electromagnetic force of the inductor 1, or separated from the inductor 1 by a repulsive force of the spring 8.

In addition, a hub 3 is mounted, around the drive axle, at a flange 4 on the side of a motor (e.g., a drive motor, a travel motor and the like), and a friction disk 2 is coupled to an outer circumference of the hub 3 so that the armature 7 constrains the friction disk 2 or releases the constraint, thereby activating or deactivating the braking operation.

An assembly screw 5 and an adjusting screw 6 are means to assemble and adjust such configurations.

However, since the EM brake and the main service brake are separated from each other to be individually controlled, a plurality of brake actuators, friction disks, controllers, and the like are required, which makes the configuration complicated, and there is a disadvantage in securing a mounting space.

In addition, the EM brake is configured to apply a braking force only when parking the vehicle.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Embodiments may be directed to an electric brake system for an electric vehicle, which is more economical by simplifying a configuration of an electric vehicle that includes a main service brake and an electromagnetic brake.

According to an embodiment, an electric brake system for an electric vehicle includes an inductor, in a spherical shape, formed so that a drive axle penetrates through a center portion of the inductor; a plurality of springs inserted into holes defined in the inductor; an armature, in a disk shape, provided to contact the spring; and a friction disk mounted on a side of a motor. A braking force is generated by operating the friction disk toward the armature.

In an embodiment, the electric brake system for an electric vehicle may further include a brake member disposed between the motor and the friction disk. The brake member may operate the friction disk toward the armature.

In an embodiment, the brake member may operate the friction disk by a volume change, In an embodiment, the electric brake system for an electric vehicle may further include an actuator connected to the brake member to operate the brake member.

In an embodiment, the actuator may operate the brake member in a hydraulic or mechanical or electromagnetic manner.

In an embodiment, the actuator may be operated in conjunction with a change in an angle of a brake pedal.

In an embodiment, a degree of braking to which the brake member engages the friction disk to the armature may be proportionally controllable.

The foregoing is illustrative only and is not intended to be in any way limiting. In addition to the illustrative aspects, embodiments and features described above, in addition aspects, embodiments and features will become apparent by reference to the drawings and the following detailed description.

BRIEF DESCRIPTION OF THE DRAWINGS

A more complete appreciation of the present disclosure will become more apparent by describing in detail embodiments thereof with reference to the accompanying drawings, wherein.

DETAILED DESCRIPTION

Embodiments will now be described more fully hereinafter with reference to the accompanying drawings. In order to fully understand the present disclosure, the operational advantages of the present disclosure, and the objects achieved by the practice of the present disclosure, reference should be made to the accompanying drawings which illustrate preferred embodiments of the present disclosure and the contents described in the accompanying drawings. However, the scope of the present invention is not limited to the embodiments and should be construed as including all the changes, equivalents and substitutions included in the spirit and scope of the present invention.

In describing preferred embodiments of the present disclosure, well-known techniques or repeated descriptions that may unnecessarily obscure the subject matter of the present disclosure will be shortened or omitted.

Figure 1:
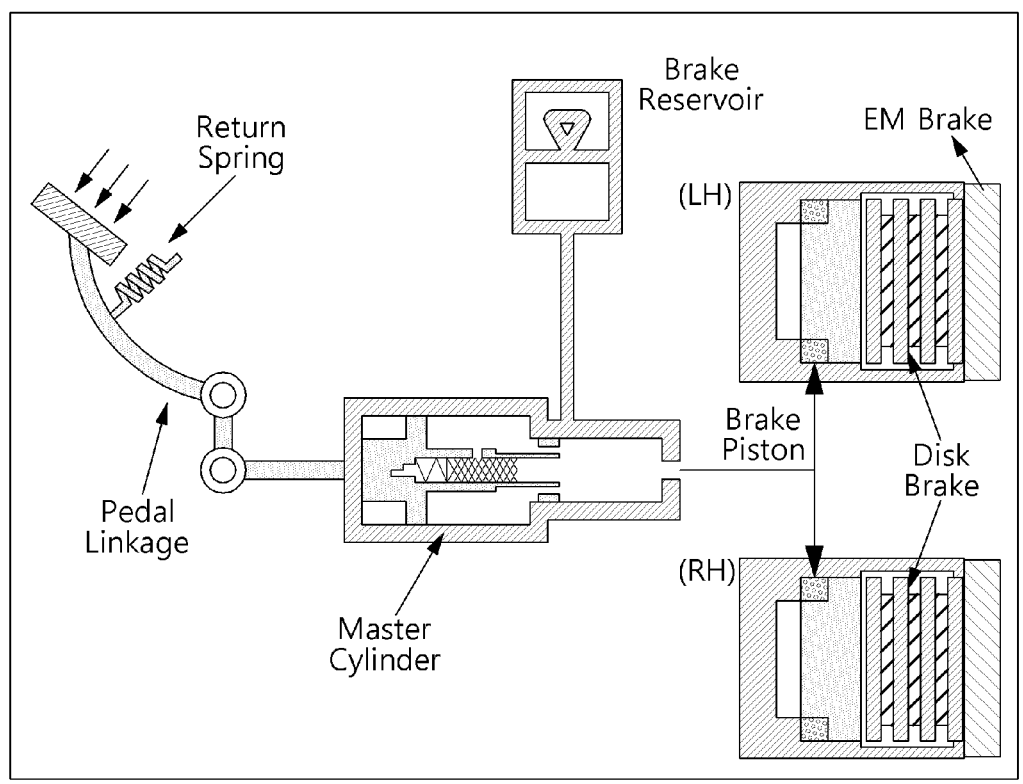
FIG. 1 schematically illustrates a brake system of a general electric vehicle.
Figure 2:
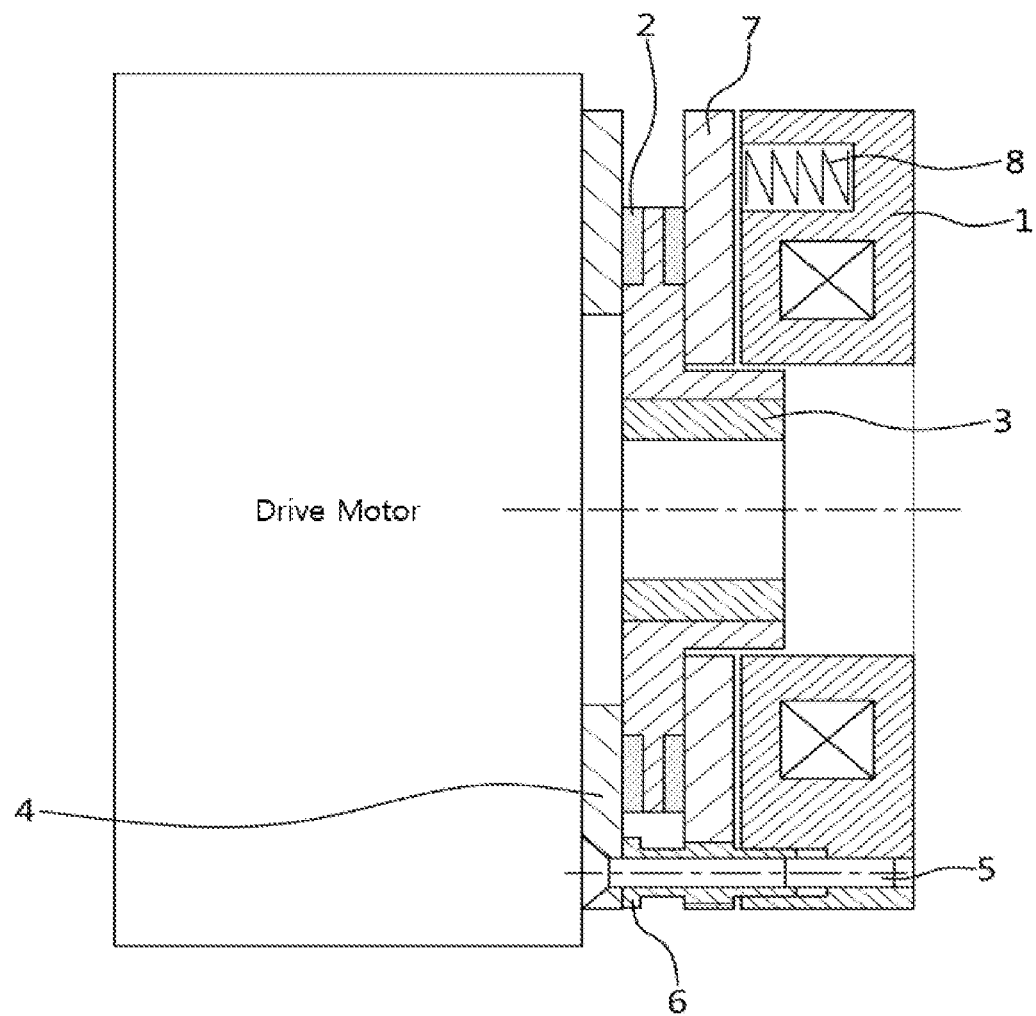
FIG. 2 schematically illustrates a general electromagnetic brake.
Figure 3:
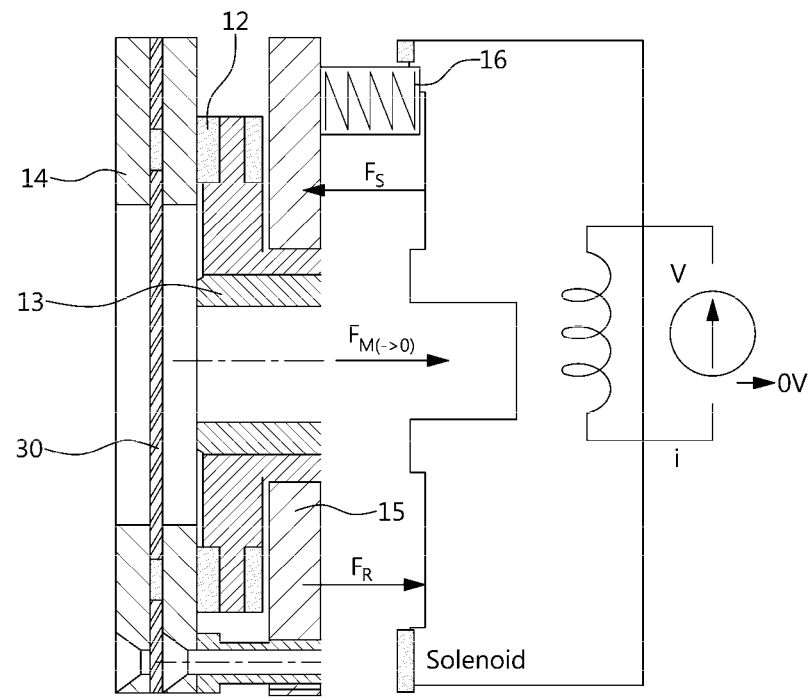
FIGS. 3 to 5 illustrate a brake system and an operation state of an electric vehicle according to the present disclosure.
Figure 4:
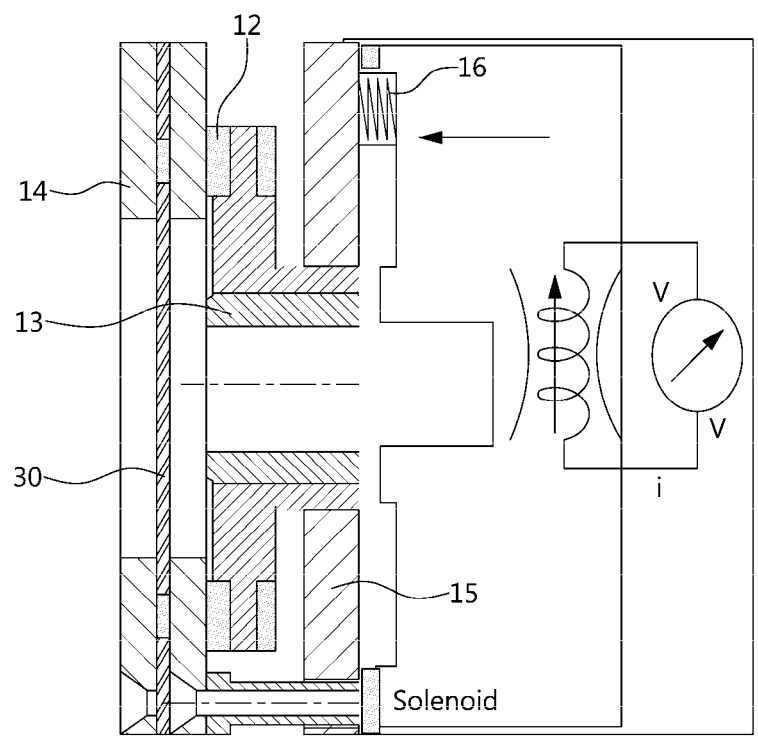
Figure 5:
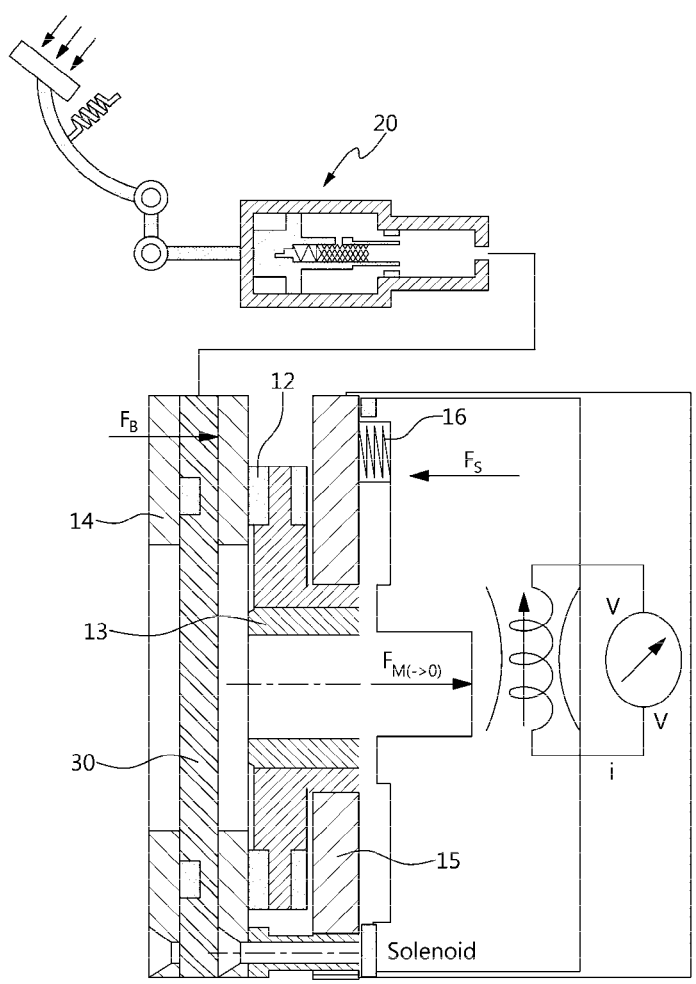

FIGS. 3 to 5 illustrate a brake system and an operation state of an electric vehicle according to the present disclosure.

Hereinafter, a brake system for an electric vehicle according to an embodiment of the present disclosure will be described with reference to FIGS. 3 and 5.

An emergency brake system and an emergency braking method according to an embodiment of the present disclosure are a brake system in vehicles, powered by electricity, equipped with a main service brake for controlling reduction of the rotation number of the motor by a signal of a brake pedal and an electromagnetic brake (hereinafter, referred to as an "EM brake") for controlling the rotation of the motor to park the vehicles, which allows the EM brake to generate a braking force while driving (e.g., traveling), thereby overcoming the limitation of a braking force generated only by the main service brake while driving.

The electric brake system according to an embodiment of the present disclosure includes, for example, an inductor, a friction disk 12, a hub 13, a flange 14, an armature 15, and a spring 16, and further includes a brake member 30, separately provided, for pressing the friction disk 12 to generate a braking force, and an actuator 20 provided for the operation of the brake member 30.

That is, an electromagnetic brake constituting the present disclosure includes an inductor, in a spherical shape (e.g., of a concentric spherical type), formed so that a drive axle may penetrate a center portion of the inductor, a plurality of springs 16 inserted into holes defined in the inductor, and an armature 15, in a disk shape (e.g., in a circular plate shape), provided in contact with the spring 16 and attached to the inductor while the spring 16 is compressed by an electromagnetic force of the inductor, or separated from the inductor by a repulsive force of the spring 16.

In addition, the hub 13 is mounted, around the drive axle, at the flange 14 on the side of a motor (e.g., a drive motor, a travel motor and the like), and the friction disk 12 is coupled to an outer circumference of the hub 13.

When a voltage across the inductor is released in a negative manner in the electromagnetic brake, as illustrated in FIG. 3, $F_S$ becomes greater than a combined force of $F_M$ and $F_R$, such that the armature 15 is engaged with the friction disk 12 to provide a braking force for parking. On the other hand, when a voltage is applied to the inductor, as illustrated in FIG. 4, $F_M$ becomes greater than a combined force of $F_S$ and $F_R$, such that the armature 15 is disengaged from the friction disk 12 to release the parking.

In addition, in the present disclosure, the brake member 30 is disposed between the flange 14 and the friction disk 12 so that the armature 15 may be engaged with the friction disk 12 while driving, to serve as a main service brake to generate a braking force while driving. Alternatively, the brake member 30 may be provided in the flange 14 and thus may operate together with the flange 14 to operate the friction disk 12 toward the armature 15.

The brake member 30 presses the friction disk 12 toward the armature 15 according to a volume change, irrespective of the armature 15, so that the friction disk 12 may be engaged with the armature 15 to serve as a service brake.

In addition, an operation force of the brake member 30 for the brake member 30 to press the friction disk 12 is imparted by the actuator 20.

The actuator 20 may be a hydraulic type, as illustrated in the drawings, but other than that, the actuator 20 may operate the brake member 30 by a mechanical lever, a mechanical torsion lever, a mechanical cable, an electromagnetic force, and the like.

Further, the actuator 20 may be controlled and driven by a control signal of a separately provided controller, or may be operated in conjunction with a change of an angle of a brake pedal, as illustrated in the drawings.

Accordingly, the degree to which the brake member 30 presses the friction disk 12 and the degree of braking may be proportionally controlled.

As such, the electric brake system of the present disclosure may serve as a service brake even while driving, which is more advantageous for securing a braking force, and enables safe braking even in situations where emergency braking is required.

As set forth hereinabove, in the electric brake system for an electric vehicle according to one or more embodiments of the present disclosure, the electromagnetic brake also serves as a main service brake, thereby making the configuration simpler than before.

That is, a plurality of brake actuators, friction disks, controllers, and the like are not required, so there is an advantage in that a mounting space may be secured.

Although the present disclosure described above has been described with reference to the illustrated drawings, it is apparent for those in the pertinent art that the present disclosure is not limited to the described embodiments and that it can be variously modified and changed without departing from the spirit and scope of the present disclosure. Therefore, it should be understood that modifications or variations as such belong to the scope of claims of the present disclosure, and the scope of the invention should be interpreted based on the appended claims.

What is claimed is:

1. An electric brake system for an electric vehicle, comprising:
   an inductor, formed so that a drive axle penetrates through a center portion of the inductor;
   a plurality of springs inserted into holes defined in the inductor;
   an armature, in a disk shape, provided to contact the spring and operated by the inductor to generate a first braking force;
   a friction disk mounted on a side of a motor; and
   a brake member disposed between the motor and the friction disk,
   wherein when the first braking force due to the operation of the armature is released, a second braking force is generated by operating the friction disk toward the armature and
   wherein the brake member operates the friction disk to provide the second braking force.

2. The electric brake system for an electric vehicle of claim 1, wherein the brake member operates the friction disk by a volume change.

3. The electric brake system for an electric vehicle of claim 1, further comprising an actuator connected to the brake member to operate the brake member.

4. The electric brake system for an electric vehicle of claim 3, wherein the actuator operates the brake member in a hydraulic or mechanical or electromagnetic manner.

5. The electric brake system for an electric vehicle of claim 4, wherein the actuator is operated in conjunction with a change in an angle of a brake pedal.

6. The electric brake system for an electric vehicle of claim 5, wherein a degree of braking to which the brake member engages the friction disk to the armature is proportionally controllable.

\* \* \* \* \*